US011190459B2

(12) United States Patent
Dick et al.

(10) Patent No.: US 11,190,459 B2
(45) Date of Patent: *Nov. 30, 2021

(54) CONNECTION POOL MANAGEMENT (71) Applicant: International Business Machines Corporation, Armonk, NY (US)

(72) Inventors: Adrian D. Dick, Southampton (GB); Brian C. Homewood, Hampshire (GB); Christopher Matthewson, Eastleigh (GB); Craig H. Stirling, Winchester (GB)

(73) Assignee: International Business Machines Corporation, Armonk, NY (US)

(*) Notice: Subject to any disclaimer, the term of this patent is extended or adjusted under 35 U.S.C. 154(b) by 258 days.

This patent is subject to a terminal disclaimer.

(21) Appl. No.: 16/508,037

(22) Filed: Jul. 10, 2019

(65) Prior Publication Data

US 2019/0349312 A1 Nov. 14, 2019

Related U.S. Application Data

(63) Continuation of application No. 14/974,435, filed on Dec. 18, 2015, now Pat. No. 10,389,652.

(30) Foreign Application Priority Data

Dec. 19, 2014 (GB) ..................................... 1422731

(51) Int. Cl.
*H04L 12/927* (2013.01)
*H04L 12/911* (2013.01)

(52) U.S. Cl.
CPC ............ *H04L 47/803* (2013.01); *H04L 47/78* (2013.01)

(58) Field of Classification Search
CPC ...... H04L 47/78; H04L 47/803; H04L 67/141
See application file for complete search history.

(56) References Cited

U.S. PATENT DOCUMENTS 6,105,067 A 8/2000 Batra
6,434,543 B1 8/2002 Goldberg et al.
(Continued)

FOREIGN PATENT DOCUMENTS

WO WO 2004034192 4/2004

OTHER PUBLICATIONS

IPO: International Search Report, Application No. GB1422731.8, dated Jul. 3, 2015.
(Continued)

*Primary Examiner* — Nicholas R Taylor
*Assistant Examiner* — Michael Li
(74) *Attorney, Agent, or Firm* — Heslin Rothenberg Farley & Mesiti P.C.; Alexander Jochym, Esq.

(57) ABSTRACT

A method, system, and computer program product that includes a processor assigning a network connection to an application, based upon the application requesting the network connection from a pool of network connections for connecting applications to a network resource, the assigned network connection for communicating a message with the network resource. The processor replaces the assigned network connection in the pool with a placeholder comprising configuration data of the assigned connection. The processor determined a period of inactivity of the assigned network connection, and the processor returns the assigned network connection to the pool, based upon the period reaching a defined threshold of inactivity.

20 Claims, 6 Drawing Sheets

(56) References Cited

U.S. PATENT DOCUMENTS

| | | |
|---|---|---|
| 7,251,700 B2 | 7/2007 | Irudayaraj et al. |
| 7,844,720 B2 | 11/2010 | Li et al. |
| 8,244,865 B2 | 8/2012 | Burke et al. |
| 8,271,659 B2 | 9/2012 | Irudayaraj et al. |
| 8,463,922 B2 | 6/2013 | June et al. |
| 8,631,120 B2 | 1/2014 | Susai et al. |
| 2002/0059428 A1 | 5/2002 | Susai et al. |
| 2004/0098726 A1* | 5/2004 | Currie .................. H04L 69/329 719/310 |
| 2004/0243642 A1 | 12/2004 | Irudayaraj et al. |
| 2004/0255307 A1 | 12/2004 | Irudayaraj |
| 2006/0095572 A1 | 4/2006 | Burke et al. |
| 2008/0228923 A1* | 9/2008 | Chidambaran ..... H04L 67/2809 709/227 |
| 2009/0064199 A1 | 3/2009 | Bidelis et al. |
| 2010/0058455 A1 | 3/2010 | Irudayaraj et al. |
| 2012/0278385 A1* | 11/2012 | Papakipos ........... H04L 12/6418 709/204 |
| 2014/0019628 A1* | 1/2014 | Shankar ................. G06F 9/541 709/228 |
| 2014/0229525 A1 | 8/2014 | Crawford |

OTHER PUBLICATIONS

Paul Titheridge, "Using JMS Connection Pooling With Websphere Application Server an Websphere MQ , Part 2", Sep. 2007, 10 pages.

Feng et al., "A New Method In Improving Database Connection Pool Model", International Science Index vol. 1, No. 5, 2007, waset.org/Publications/1910, http:waste.org/publications/1910/a-new-method-in-improving-database-connection-pool-model.

List of IBM Patents or Patent Applications Treated as Related, Jul. 25, 2019, 2 pages.

* cited by examiner

CONNECTION POOL MANAGEMENT

PRIOR FOREIGN APPLICATION

This application claims priority from European patent application number 1422731.8, filed Dec. 19, 2014, which is hereby incorporated herein by reference in its entirety.

BACKGROUND

Connection pools are commonly used in computer system architectures to facilitate network access by applications hosted by the computer system. Such applications may require network access to communicate with a remote application, e.g., a database application hosted on a remote server over networks such as the Internet or the like. The provision of a pool of connections enhances the performance of the computer system due to the fact that the applications do not have to initiate a network connection from scratch, which can be computer resource intensive and can seriously degrade the performance of the system where many applications frequently attempt to connect to network resources, e.g., queue managers for managing the communication of messages between (client and server) applications over a network. Such computer systems may host application servers for hosting a plurality of applications and for maintaining a connection pool comprising a finite number of connections for the aforementioned purposes.

A problem associated with such connection pools is that connections in the pool that have been assigned to applications may go stale, i.e., may become unused without having been returned to the pool, such that the connection pool may dry up, i.e. the number of available connections may drop below critical levels such that applications requesting connections from the pool may have to wait for a connection to become available, which waiting time may exceed acceptable limits if connections are not being returned to the pool.

SUMMARY

Shortcomings of the prior art are overcome and additional advantages are provided through the provision of a computer program product for managing a server hosting a plurality of applications and maintaining a connection pool of network connections for connecting applications to a network resource. The computer program product comprises a storage medium readable by a processing circuit and storing instructions for execution by the processing circuit for performing a method. The method includes, for instance: assigning, by a processor, a network connection to an application, based upon the application requesting the network connection from a pool of network connections for connecting applications to a network resource, the assigned network connection for communicating a message with the network resource; replacing, by the processor, the assigned network connection in the pool with a placeholder comprising configuration data of the assigned connection; determining, by the processor, a period of inactivity of the assigned network connection; and returning, by the processor, the assigned network connection to the pool, based upon the period reaching a defined threshold of inactivity.

Shortcomings of the prior art are overcome and additional advantages are provided through the provision of a method of managing a server hosting a plurality of applications and maintaining a connection pool of network connections for connecting applications to a network resource. The method includes, for instance: assigning, by a processor, a network connection to an application, based upon the application requesting the network connection from a pool of network connections for connecting applications to a network resource, the assigned network connection for communicating a message with the network resource; replacing, by the processor, the assigned network connection in the pool with a placeholder comprising configuration data of the assigned connection; determining, by the processor, a period of inactivity of the assigned network connection; and returning, by the processor, the assigned network connection to the pool, based upon the period reaching a defined threshold of inactivity.

Shortcomings of the prior art are overcome and additional advantages are provided through the provision of a system for managing a server hosting a plurality of applications and maintaining a connection pool of network connections for connecting applications to a network resource. The system includes a memory, one or more processor in communication with the memory, and program instructions executable by the one or more processor via the memory to perform a method. The method includes, for instance: assigning, by a processor, a network connection to an application, based upon the application requesting the network connection from a pool of network connections for connecting applications to a network resource, the assigned network connection for communicating a message with the network resource; replacing, by the processor, the assigned network connection in the pool with a placeholder comprising configuration data of the assigned connection; determining, by the processor, a period of inactivity of the assigned network connection; and returning, by the processor, the assigned network connection to the pool, based upon the period reaching a defined threshold of inactivity.

Methods and systems relating to one or more aspects are also described and claimed herein. Further, services relating to one or more aspects are also described and may be claimed herein.

Additional features and advantages are realized through the techniques described herein.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures. It should be understood that the Figures are merely schematic and are not drawn to scale.

In the context of the present application, where embodiments of the present invention constitute a method, it should be understood that such a method is a process for execution by a computer, i.e., is a computer-implementable method. The recited portions of the method therefore may reflect various parts of a computer program, which may include various parts of one or more algorithms.

As aforementioned, a problem associated with the connection pools is that connections in the pool that have been assigned to applications may go stale. One way of addressing this problem is by increasing the number of connections in the pool, but this is often undesirable from a management perspective, and this may simply delay rather than solve the problem of the number of available connections in the pool falling below critical levels.

A common solution to this problem, as for instance disclosed in US 2010/0058455 A1, which is hereby incorporated herein by reference in its entirety, is to provide each assigned connection with a timer that ensures that a connection is torn down, e.g., returned to the connection pool, after a certain period of time, e.g., a certain period during which the connection has seen no activity. This approach ensures that the connection pool is continuously replenished, thus reducing the risk of applications being starved from available connections.

However, this approach introduces a different problem, namely the risk that active connections are prematurely returned to the connection pool, which can cause exceptions when the application to which the connection was originally assigned attempts to resume use of the connection, e.g., after a period of inactivity, due to the fact that the connection longer exists. For instance, such an application may have to temporarily suspend communication over the connection because a time-consuming task has to be performed, such as a database update or the like, before the communication can be resumed.

This problem may be alleviated to an extent by increasing the timeout threshold before a connection is returned to the pool, but this increases the risk of starvation of other applications because of a lack of available connections in the connection pool.

Aspects of some embodiments of the present invention relate to a method of managing a server hosting a plurality of applications and maintaining a connection pool of network connections for connecting applications to a network resource.

Aspects of some embodiments of the present invention relate to a computer program product facilitating the implementation of a method of managing a server hosting a plurality of applications and maintaining a connection pool of network connections for connecting applications to a network resource on a computer system.

Aspects of some embodiments of the present invention relate to a computer system product, including a computer program product, and adapted to implement a method of managing a server hosting a plurality of applications and maintaining a connection pool of network connections for connecting applications to a network resource.

Figure 1:
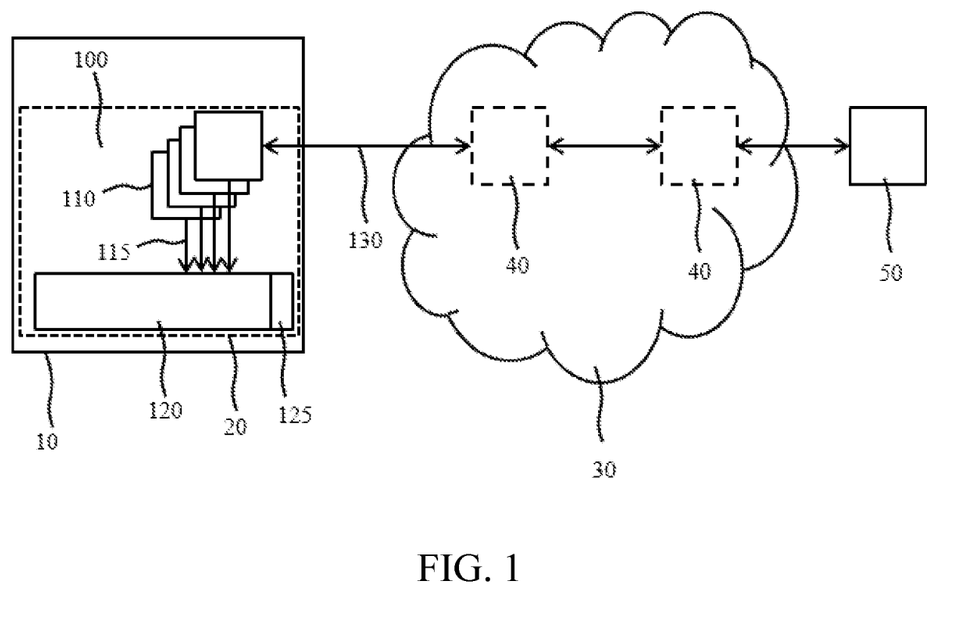
FIG. 1 schematically depicts a network architecture including a computer system implementing an application server according to aspects of an embodiment of the present invention.

FIG. 1 schematically depicts a computer system 10 comprising a processor arrangement 20 including one or more processors, wherein the processor arrangement 20 is adapted to host an application server 100 that implements a plurality of applications 110, e.g., web applications, and a connection pool 120 to which the applications 110 are communicatively coupled as symbolically indicated by arrows 115 and from which the applications 110 can request network connections 130 for connecting to a network 30 on which one or more remote resources 50, such as a remote database, a remote application or the like is available to which the application 110 requesting the network connection 130 is trying to connect. The network 30 may be any suitable type of network, such as the Internet, a mobile communications network, e.g., a 3G or 4G network, and so on.

The application server 100 may be adapted to directly connect to such a remote resource 50 or to use message routing services, e.g., message queue managers 40, to connect to the remote resource 50, wherein each queue managers 40 may be associated with at least one client or server on the network 30 and may be adapted receive communications, e.g., messages, from applications running on its associated client or server and communicate these messages to target queue managers for distribution to a target resource associated with the target queue manager, such as a client application or a server or service provider, e.g., a database or the like. Such queue managers 40, for instance, may be used in architectures in which resources are not permanently available such that the queue manager associated with an off-line resource can retain the messages directed to that resource until the resource comes on-line.

The application server 100 may be hosted on any suitable hardware architecture, i.e., any suitable computer system 10, which may be a distributed computer system in which different processors of the processor arrangement 20 may be located in different physical entities, with different processors hosting different parts of the application server 100, e.g., different applications 110, the connection pool 120 including the pool manager 125, and so on. As will be readily understood by the skilled person, such a computer system 10 may further comprise at least one of one or more main memory units, a mass storage interface for connecting the computer system 10 to a mass storage device, a display interface for connecting the computer system 10 to a display device, a network interface for connecting the computer system 10 to the network 30, an input/output (I/O) interface for connecting the computer system 10 to one or more I/O devices, each communicatively coupled to the processor arrangement 20 in any suitable manner, e.g., using a system bus.

The computer system 100 may further comprise peripheral components such as a mass storage device, a display device and/or one or more I/O devices connected to the processor arrangement 20 through the aforementioned appropriate interface. The skilled person will readily understand that the teachings of the present invention are not tied to a particular computer system architecture and that any suitable computer system configuration may be used to implement aspects of the present invention. Although FIG. 1 depicts a single computer system 10, e.g., a single client system, it should be understood that the network 30 may be connected to a plurality of such computer systems 10 each hosting an application server 100. This by way of non-limiting example may be an implementation of a plurality of web applications accessible over the Internet.

As will be apparent from the following, the computer system 10 further comprises a computer program product that comprises a computer-readable storage medium carrying computer-readable program instructions for managing the connection pool 120 of the application server 100 hosting the plurality of applications 100. This computer program product implements a method of managing the server 100 and maintaining the connection pool 120 of network connections 130 for connecting applications 110 to a network resource 50. The computer-readable program instructions may form part of a program implementing the application server 100.

As previously explained, the pool 120 of pre-configured network connections 130 can avoid the need for the applications 110 to generate such connections from scratch, which as previously explained can be resource intensive, for instance when connecting to a remote resource such as a Java message server provider with a web application 110 hosted by the application server 100. In order to obtain such a network connection 130, an application 110 may send a request for such a connection to the pool manager 125, which may assign such a network connection 130 to the application 110 from the pool 120.

Figure 2:
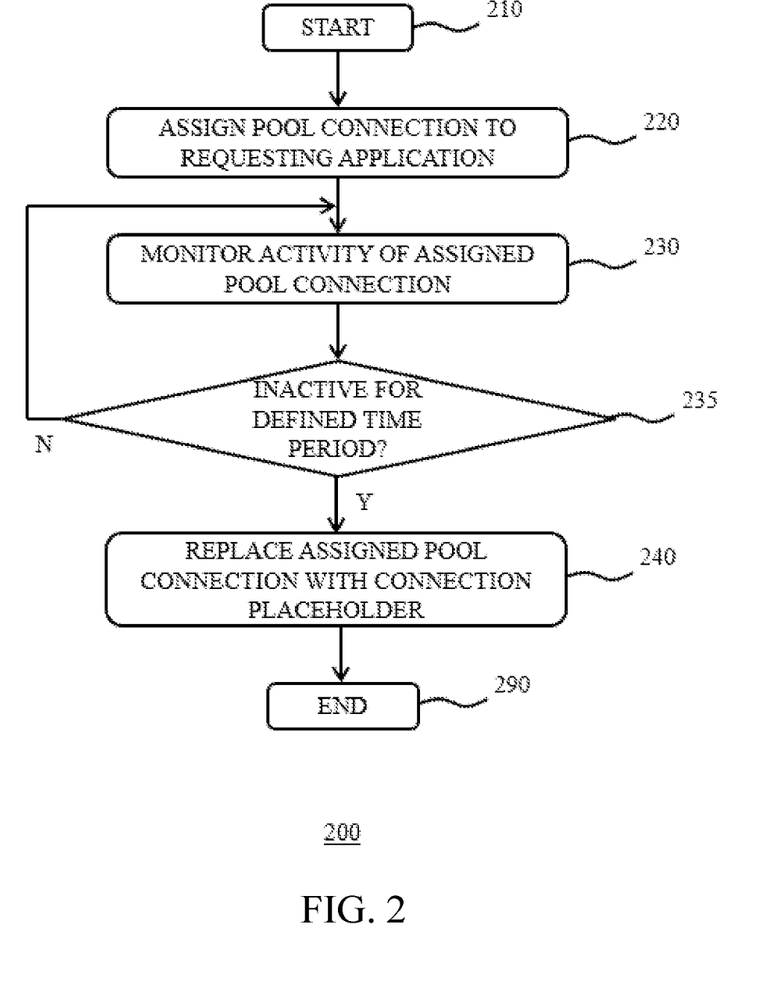
FIG. 2 depicts an aspect of a connection pool management method according aspects of an embodiment of the present invention.

The flowchart of FIG. 2 depicts a method 200 of managing the connection pool 120 according to an aspect of an embodiment of the present invention. The method 200 starts, for instance, by initializing or otherwise launching the application server 100 and/or one or more of the applications 110 (210). The application 110 may request a network connection 130 from the pool manager 125 and in which the pool manager 125 may check the connection pool 120 for available network connections and assign an available network connection 130 to the requesting application 110 to allow the application 110 to send messages over the network 30 to a remote resource 50, e.g., directly or via a network of queue managers 40 as previously explained (220). It is noted that it is of course well-known per se to allow applications 110 access to the network 30 by the provision of a connection pool 120 from which network connections 130 can be assigned to such applications 110 such that this will not be further explained for the sake of brevity only.

Upon assignment of a network connection 130 from the connection pool 120 to a requesting application 110, the connection pool manager 125 monitors the activity over the network connection 130 assigned to the application 110 in order to determine a period of inactivity of the network connection 130, as such a period of inactivity may indicate that a network connection 130 has gone stale and should be returned to the connection pool 120 (230). The connection pool manager 125, for instance, may compare the determined period of inactivity with a defined threshold (235), i.e., a defined period of inactivity for which it has been decided that a network connection 130 should be returned to the connection pool 120. Such a defined threshold, for instance, may be defined by a system operator or administrator in order to ensure that the connection pool 120 retains sufficient available network connections 130 for assigning to requesting applications 110 such that the overall performance of the application server 100 is not compromised by a sub-optimal number of available network connections 130 in the connection pool 120, i.e., a critically low number of such available network connections 130.

Based on determining that the assigned network connection 130 has not yet reached a defined period of inactivity (235), the pool connection manager 125 may continue to monitor the activity over the assigned network connection 130 (230). On the other hand, if it is determined (e.g., at 235) that the assigned network connection 130 has timed out, i.e., has been inactive for a defined period of time, the pool connection manager 125 will remove the assigned network connection 130 from the application 110 and will replace the removed network connection 130 with a connection placeholder containing configuration data allowing the resumption of the connection to the application, e.g., contextual information about the network connection 130 and its use, such as target destination of the messages sent over the network connection 130, type and purpose of the communication over the network connection 130, transactional information such as a transaction identifier, and so on.

The pool connection manager 125 may implement such a placeholder in any suitable manner, for instance as a log file that records the network connections 130 retrieved from in active applications 110 together with the necessary (context) information about the retrieved network connections 130, such that the pool connection manager 125 retains an awareness about past assignments of network connections 130 to requesting applications 110, which allows the pool connection manager 125 to restore such a network connection 130 at a later stage, for instance upon the requesting application signaling an intention to resume a communication over the previously assigned network connection 130, as will be explained in more detail below.

Without such a placeholder, the application 110 will encounter a broken connection exception because a network connection 130 is no longer present. However, the placeholder ensures that even though no network connection 130 is presently assigned to the application 110, such a network connection 130 may be readily restored, thereby avoiding such exceptions and improving the overall performance of the application server 100.

Of course, the removal of a network connection 130 assigned to application 110 may not necessarily be followed by the restoration of the network connection 130 because the network connection 130 may have been a stale network connection, i.e., a network connection no longer in use by the application 110 where the application 110 has failed to return the network connection 130 to the pool of network connections 120. In such a scenario, after replacing the assigned network connection 130 from the pool 120 with a connection placeholder, the method 200 may simply terminate in step 290.

At this point, it is noted that FIG. 2 depicts a flowchart of the method 200 for the monitoring and maintaining of a single network connection 130 for the sake of clarity only. It should be understood that the method 200 may be performed for a plurality of network connections 130 assigned to one or more applications 110 of the application server 100.

Figure 3:
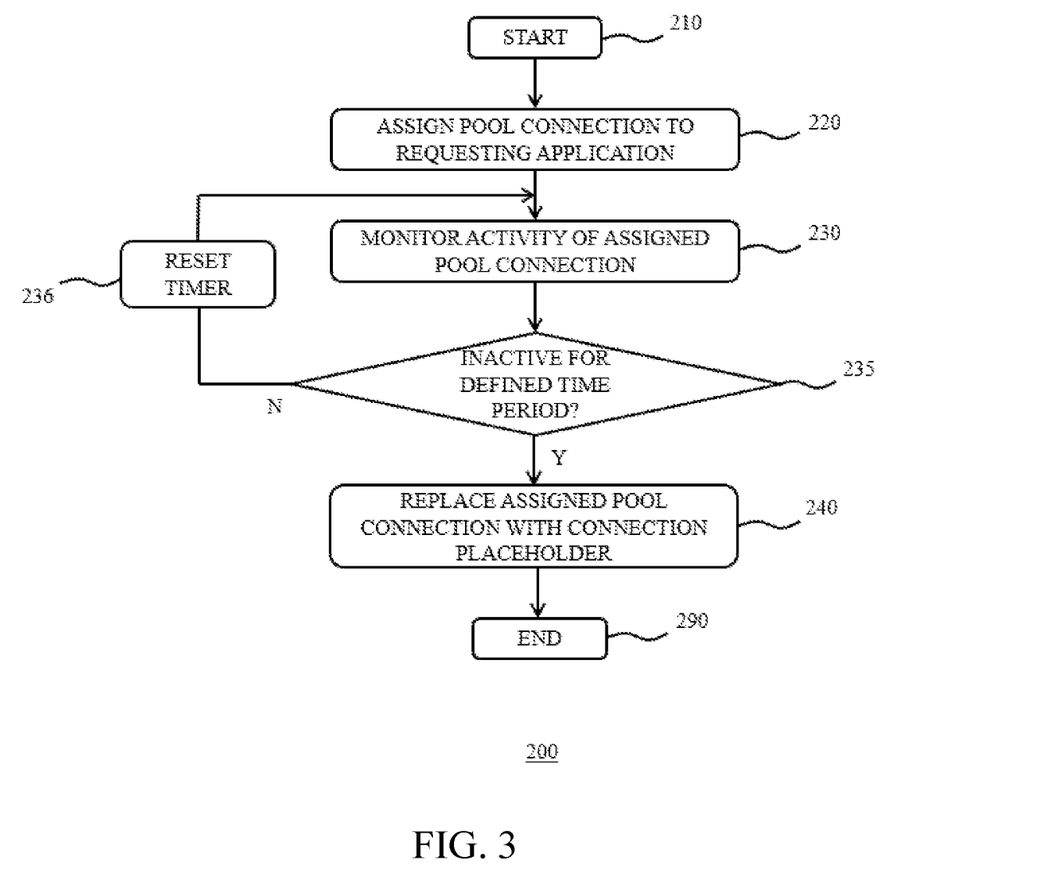
FIG. 3 schematically depicts aspects of a connection pool management method according to an embodiment of the present invention.

FIG. 3 depicts a flowchart of an aspects of an embodiment of the present invention, which illustrate aspects of method 200. The method 200, as shown in FIG. 3, differs from the depiction of this method in FIG. 2 in that the pool connection manager 125 operates a countdown timer that counts down from the defined threshold to zero in order to determine in step 235 if the network connection 130 has been inactive for the defined period of time, i.e., if the counter has reached zero (230). The method 200 may further comprise detecting an activity, e.g., a message communication, on the monitored network connection 130, and resetting the timer to its default (initial) value (235), which typically is the defined period of inactivity, after which the assigned network connection 130 should be returned to the pool 120 such that the premature removal of a network connection 130 assigned to an application 110 is avoided. For example, where the timer counts down from an initial value of 30 seconds and observes a communication over the network connection after 25 seconds, without such a timer reset the application 110 would only have access to the network connection 130 for another 5 seconds before the network connection is removed by the pool connection manager 125, which may be undesirable given that in such a scenario it is very likely that the application 110 has not yet completed its communication over the assigned network connection 130, in which case the performance penalty associated with the removal of the assigned network connection 130, the replacement of that connection with the connection placeholder in the connection pool 120 and the subsequent restoration of a network connection 130 to the application 110 upon the application 110 attempting to resume its communication is undesirable and preferably should be avoided.

In an embodiment of the present invention, the application 110 may force the timer to reset by periodically sending a call or another suitable communication over the assigned network connection 130, e.g., a timer reset method call. This for instance may be useful if the application 110 is aware of the fact that its network connection 130 may time out and has not yet completed the required communication over the network connection 130 but cannot resume the communication within the time out period, for instance because the application 110 is performing some background task that prevents the application 110 from resuming the communication over the network connection 130. The facility of the application 110 to send such periodic communications, e.g., calls, may be configurable, i.e., toggled between an enabled and disabled state, such as by an administrator or system operator. This for instance facilitates the disabling of this facility in case it is undesirable that an application 110 hangs on to a network connection 130 in this manner, for instance because of high demand of a limited number of network connections 130 in the connection pool 120 by a large number of applications 110.

As previously explained, the removal of inactive network connection 130 from the application 110 by the pool connection manager 125 may equate to the removal of a stale network connection 130, in which case the application 110 will not attempt to resume communications over the removed network connection 130. However, it is of course also feasible that the removed network connection 130 is still in use by the application 110, in which case the connection placeholder may need to be used to reassign a network connection 130 from the connection pool 120 to the application 110 in order to avoid the application 110 experiencing a broken connection exception. A possible scenario to be implemented by the method 200 is depicted by the flowchart in FIG. 4.

Figure 4:
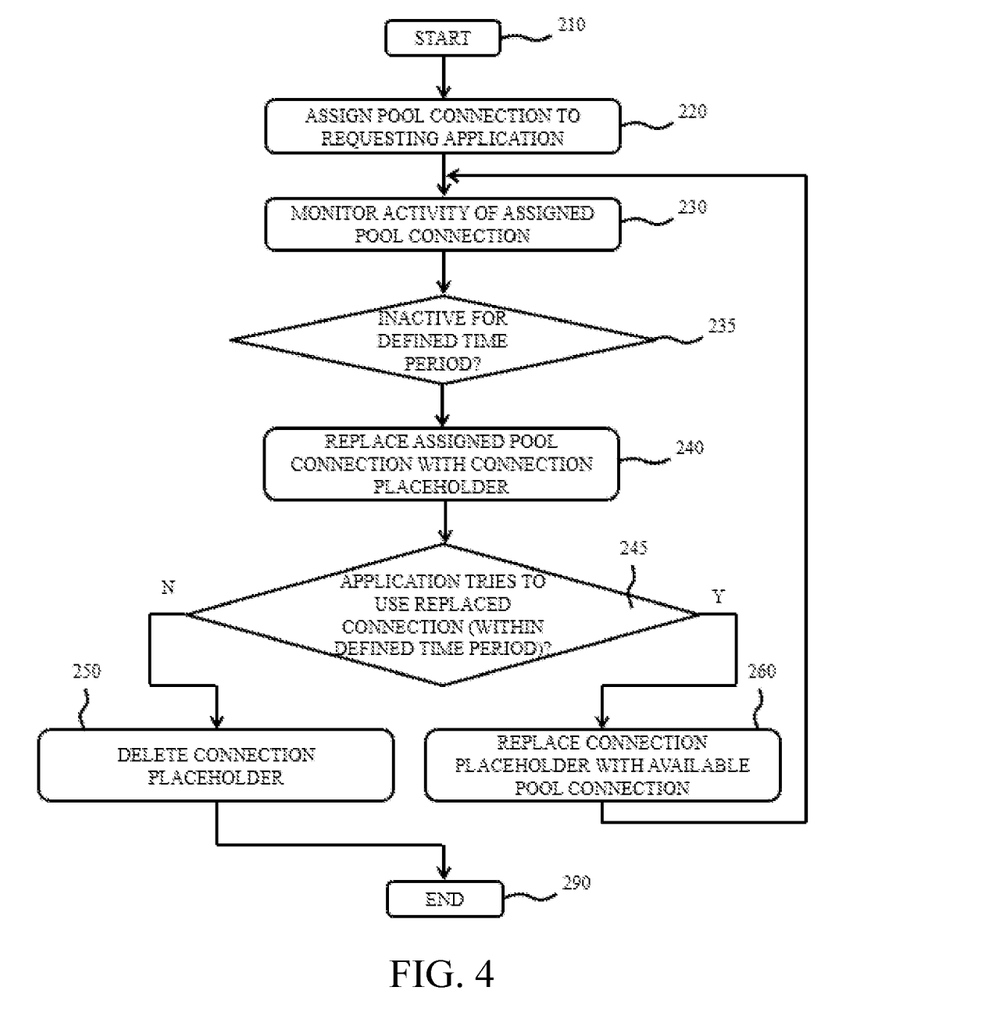
FIG. 4 schematically depicts a further aspect of a connection pool management method according to aspects of embodiments of the present invention depicted in FIG. 2 or FIG. 3.

In this scenario, the method 200 may proceed to aspect 245 after aspect 240, in which an inactive network connection 130 is replaced with a connection placeholder as previously explained. As seen in FIG. 4, the application 110 corresponding to the connection placeholder, i.e., the application 110 that had a network connection 130 replaced by a connection placeholder due to a certain period of inactivity of the network connection 130 as previously explained, tries to attend to resume a communication over this connection, for instance by the application 110 making a call, e.g., some type of API call, on the assumed present network connection 130, which call will be received by the placeholder, i.e., the pool connection manager 125 instead (245). The pool connection manager 125 for instance may check if this call is associated with an existing placeholder, in which case the method 200 may proceed to reassign an available network connection 130 in the pool 120 to the application 110 and reconfigure the available network connection in accordance with the configuration information in the placeholder such that the application 110 may continue its communication over the reassigned network communication 130 without encountering a broken connection exception (260).

In case no network connection 130 is immediately available in the connection pool 120, the application 110 may be forced to wait for a network connection 130 to become available, e.g., upon return of a network connection 130 to the pool 120 by an application 110 or by the pool connection manager 125. In an embodiment of the present invention, this does not equate to a broken connection exception because the awareness of the existence of the network connection is still present within the application server 100 by means of the connection placeholder, such that the temporary unavailability of a network connection 130 to replace the connection placeholder merely equates to a delay in the communication, e.g., the sending of a message by the application 110, rather than a loss of the communication because of the loss of a communication pipe through which the communication took place.

Upon replacement of the connection placeholder with a fresh network connection 130 from the pool 120, the method 200 may revert back to monitoring the activity over the freshly assigned network connection 130 to the application 110, by the pool connection manager 125 (230), as previously explained. This process may continue until the method is terminated (290), for instance by a user terminating the application server 100 or in any other suitable manner.

In an example embodiment, which is also depicted in FIG. 4, the method 200 may at some point in time terminate, e.g., delete, a connection placeholder if it becomes clear that it is unlikely that the application 110 will attempt to reuse the removed network connection 130, for instance because a certain period of time has elapsed after the creation of the connection placeholder, which defined period of time may be used as an indication that the application 110 has finished using the network connection 130, because the application 110 attempts to return the network connection 130 to the pool 120 or because the application 110 requests a new connection from the pool 120, which may indicate that the previously assigned network connection 130 now represented by the connection placeholder is no longer in use by the application 110. Other indications of such a previously assigned network connection 130 no longer being in use by the application 110 will be apparent to the skilled person. In an embodiment of the present invention, such an indication, for instance, may be detected (245) after which the method the connection placeholder is deleted (250), after which the method 200 may terminate in (290).

In an embodiment, the communications by the application 110 over the assigned network connection 130, e.g., messages sent by the application 110 over this connection, may form part of a transaction between the application 110 and the remote resource 50 over the network 30. In such a scenario, it may be necessary to inform message handlers on the network 30, e.g., one or more queue managers 40, that a network connection 130 has been removed from the application 110 partaking in the transaction because such message handlers typically associate the assigned network connection 130 with the transaction. Therefore, the message handlers must be informed that this association is no longer valid to avoid the network connection 130 being erroneously associated with this transaction after it has been returned to the pool 120 and reassigned to another application 110 using the network connection 130 for a different purpose, e.g., a different transaction or a non-transactional communication.

Figure 5:
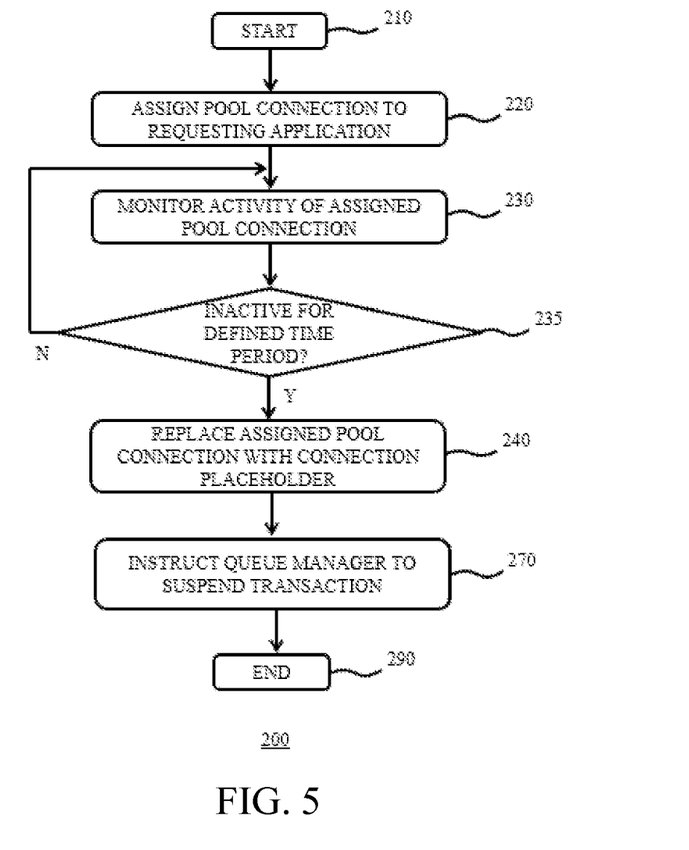
FIG. 5 schematically depicts an aspect of a connection pool management method according to an embodiment of the present invention.

In this scenario, the method 200 may include the pool connection manager 125 informing the associated queue manager 40 that the network connection 130 associated with a particular transaction that the network connection 130 is no longer associated with that transaction, to allow the queue manager 40 to remove the association between its connection handle identifying the network connection 130 and the transaction the application 110 is involved with, e.g., by informing the queue manager 40 that the transaction is to be suspended (FIG. 5, 270). This communication thus ensures that a subsequent use of the network connection 130 by another application 110 is not erroneously associated with the transaction, which may still be in progress. Instead, the reassigned network connection 130 may instead be associated with another communication by the other application 110, e.g., another transaction.

Figure 6:
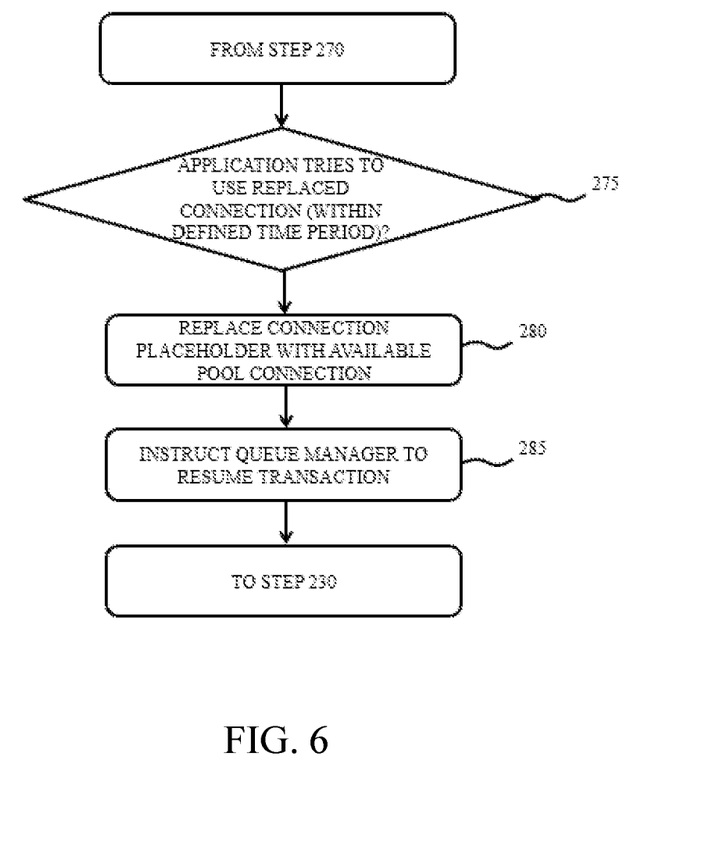
FIG. 6 schematically depicts a further aspect of a connection pool management method according to aspects of the embodiment of the present invention depicted in FIG. 5.

In case the application 110 that originally was assigned the network connection 130 resumes the communication associated with the original transaction, e.g., by sending a call that is collected by the connection placeholder, the network connection 130 newly assigned to the application 110 will need to be reassociated with the transaction in progress by the queue manager 40. This may achieved as demonstrated by the flowchart in FIG. 6, which depicts an extension to the method 200 shown in flowchart form in FIG. 5. After aspect 270, the application 110 tries to continue the transaction in progress by attempting to use the previously assigned network connection 130 as explained above (275), e.g., by sending an API call that is received by the connection placeholder in the connection pool 120. As before, the call triggers the pool connection manager 125 to replace the connection placeholder with an available network connection 130 from the pool of network connections 120 as indicated by step 280. In addition, the pool connection manager 125 informs the queue manager 40 in step 285 that the previously suspended transaction is to be resumed, which information typically includes identification information of the newly assigned network connection 130 to the application 110 such that the queue manager 40 may restore the association between the new connection handle and the transaction in progress such that the newly assigned network connection 130 is identifiably associated with the transaction in progress.

Following aspect 285, the method 200 may revert back to monitoring activity over the newly assigned network connection 130 (230), as previously explained, for instance, with the aid of FIG. 2 and FIG. 3.

Some embodiments of the present invention seek to provide a method of managing a server hosting a plurality of applications and maintaining a connection pool of that work connections for connecting the applications to a network resource wherein the risk of the occurrence of broken connection exceptions is reduced without compromising the availability of connections within the pool.

Some embodiments of the present invention seek to provide a computer program product including computer program code that when executed on a processor arrangement of a computer system implements this method.

Some embodiments of the present invention seek to provide a computer system including such a computer program product, wherein the computer system is adapted to execute the computer program code in order to implement this method.

Aspects of some embodiments of the present invention provide a method of managing a server hosting a plurality of applications and maintaining a connection pool of network connections for connecting applications to a network resource, the method comprising assigning a network connection to an application upon the application requesting the network connection from the pool for communicating a message with the network resource; determining a period of inactivity of the assigned network connection; and replacing the assigned network connection in the pool with a placeholder comprising configuration data of the assigned connection and returning the assigned connection to the pool upon the period reaching a defined threshold.

In an embodiment of the present invention, the provision of a connection placeholder for a connection returned from an application to the pool due to a timeout of the assigned connection ensures that upon the application attempting to resume the communication over the previously assigned connection the connection pool manager can simply retrieve an available connection from the pool and configure the available connection in accordance with the configuration data in the connection placeholder, thereby avoiding or at least greatly reducing the risk of a broken connection exception occurring upon the application attempting to assume the communication whilst at the same time ensuring that the connection pool is regularly replenished by returning inactive connections to the pool, thereby reducing the risk of other applications being starved from network connectivity.

In an embodiment of the present invention, the method may further comprise, upon the application attempting to resume communication of the message, replacing the placeholder with an available network connection in the connection pool; and configuring the available network connection in accordance with the configuration data in the placeholder.

In an embodiment of the present invention, the placeholders in the connection pool may also be subjected to a management policy in order to avoid an excessive number of placeholders building up in the connection pool. To this end, the method may further comprise removing the placeholder from the pool upon a precondition for the removal being met. Such a precondition for instance may be a defined age of the placeholder, i.e., a placeholder having existed for a certain period of time or a request for a new network connection by the application, which may indicate that the previously requested network connection by the application is no longer in use.

In an embodiment of the present invention, the period of inactivity may be determined by counting down a counter from the defined threshold upon the halting of the communication with the network resource by the application. In an embodiment, this may further comprise resetting the counter to the defined threshold upon the application indicating during the countdown that the network connection is still in use to ensure that the assigned connection remains assigned to the application for the determined period of time, i.e., the defined threshold, upon the application subsequently suspending communication over the network connection.

In an embodiment of the present invention, the ability of the application to provide the indication may be toggled between an enabled state and a disabled state to allow an administrator or another user of the application server authorized to do so to disable the ability of the application to provide such an indication in case the resetting of the counter is undesired for some reason.

In an embodiment of the present invention, the message forms part of a transaction and the configuration data includes data specifying the transaction. This facilitates the restoration of the transaction to its original configuration, thereby reducing the risk that a transaction cannot be resumed due to the fact that the provided connection from the connection pool is incompatible or otherwise unsuitable for facilitating the transaction. This may further involve sending a notification to the network resource, e.g., a queue manager, indicating that the transaction associated with connection handle of the network resource identifying the assigned network connection is to be suspended. This ensures that if the connection returned to the connection pool is subsequently used by a different application, the network resource does not mistake the messages being sent by this different application as forming part of the suspended transaction.

In an embodiment of the present invention, the method may further comprise sending a further notification to the network resource indicating that the transaction is to be resumed, such that for instance a further connection handle identifying a newly assigned network connection to the transaction may be created and the network resource, e.g., a queue manager, may correctly resume the previously suspended transaction.

According to an aspect of some embodiments of the present invention, there is provided a computer program product comprising a computer-readable medium carrying computer-readable program instructions for, when executed on a processor arrangement of a computer system implementing a server hosting a plurality of applications and maintaining a connection pool of network connections for connecting applications to a network resource, implementing the method according to any of the above embodiments.

According to an aspect of some embodiments of the present invention, there is provided a computer system adapted to implement a server hosting a plurality of applications and maintaining a connection pool of network connections for connecting applications to a network resource, the computer system comprising the aforementioned computer program product of claim and a processor arrangement communicatively coupled to the computer program product and adapted to execute the instructions. Such a computer system benefits from the fact that the application server hosted by the computer system is less susceptible to broken connection errors occurring whilst at the same time ensuring that the connection pool hosted by the server is regularly replenished by returning inactive network connections to the pool.

In an embodiment of the present invention, the computer system may be a distributed computer system, such as a computer system in which applications and/or the connection pool may be hosted on different physical entities.

Embodiments of the present invention may be (computer) systems, methods, and/or a computer program products. A computer program product may include a computer readable storage medium (or media) having computer readable program instructions thereon for causing a processor to carry out aspects of the present invention.

A computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method, comprising:
    assigning, by one or more processors, a network connection to a first application, based upon the first application requesting the network connection from a pool of network connections for connecting applications to a network resource, wherein the pool of network connections comprises network connections assigned to applications and network connections available to be assigned to applications, the network connection assigned to the first application for communicating a message from the first application to the network resource via a communications pathway, wherein the message comprises a part of a transaction;
    determining, by the one or more processors, a passage of a period of inactivity between the application and the resource on the network connection assigned to the application;
    returning, by the one or more processors, the network connection assigned to the first application, from the first application, to the pool, based upon the period reaching a defined threshold of inactivity, wherein based on the returning, the network connection assigned to the application is available for assignment to another application;
    replacing, by the one or more processors, in the pool, the network connection assigned to the first application, with a placeholder to avoid the first application experiencing a broken connection exception, the placeholder comprising configuration data of the network connection assigned to the first application, wherein subsequent to the replacing, the pool of network connections comprises the network connections assigned to applications, the network connections available to be assigned to applications, and the placeholder, wherein the configuration data of the connection assigned to the first application comprises data specifying the transaction including a transaction identifier of the transaction and a purpose for communication over the network connection;
    obtaining, by the one or more processors, via the placeholder, over the communications pathway, an indicator that the first application is attempting to communicate the message to the network resource;
    based on obtaining the indication via the placeholder, replacing, by the one or more processors, the placeholder with an available network connection from the pool of network connections;
    configuring, by the one or more processors, the available network connection in accordance with the configuration data in the placeholder to resume the communicating of the message and the transaction; and
    resuming, by the one or more processors, communicating of the message and the transaction.

2. The computer-implemented method of claim 1, further comprising:
    obtaining, by the one or more processors, an indicator that a precondition has been met; and
    based on obtaining the indicator, removing, by the one or more processors, the placeholder from the pool.

3. The computer-implemented method of claim 2, wherein the precondition is a defined age of the placeholder.

4. The computer-implemented method of claim 2, wherein the precondition indicates that that placeholder has existed for a certain period of time.

5. The computer-implemented method of claim 2, wherein the precondition is a request for a new network connection by the first application.

6. The computer-implemented method of claim 1, wherein the determining the period of inactivity comprises:
    obtaining, by the one or more processors, from the first application, a first indicator, indicating that communication over the network connection assigned to the first application has halted; and
    based on the obtaining the first indicator, utilizing, by the one or more processors, a counter to count down from the defined threshold.

7. The computer-implemented method of claim 6, wherein the determining the period of inactivity further comprises:
obtaining, by the one or more processors, from the application, a second indicator, indicating that communication of the network connection assigned to the first application has resumed; and
based on the obtaining the second indicator, resetting, by the one or more processors, the counter, to the defined threshold.

8. The computer-implemented method of claim 7, wherein the ability of the application to provide the first indicator and the second indicator can be toggled between an enabled state and a disabled state.

9. The computer-implemented method of claim 8, wherein the second indicator is toggled to the disabled state based on a demand for network connections exceeding a number of available network connections in the pool.

10. The computer-implemented method of claim 1, further comprising:
sending, by the one or more processors, a first notification to the network resource, the first notification indicating that the transaction is to be suspended, wherein the transaction is associated with a connection handle of the network resource, and wherein the connection handle identifies the network connection assigned to the first application.

11. The computer-implemented method of claim 10, further comprising:
sending, by the one or more processors, a second notification to the network resource, wherein the second notification indicates that the transaction is to be resumed.

12. The computer-implemented method of claim 1, wherein the network resource is a message queue manager.

13. A computer program product comprising:
a computer readable storage medium readable by a one or more processors and storing instructions for execution by the one or more processors for performing a method comprising:
assigning, by the one or more processors, a network connection to a first application, based upon the first application requesting the network connection from a pool of network connections for connecting applications to a network resource, wherein the pool of network connections comprises network connections assigned to applications and network connections available to be assigned to applications, the network connection assigned to the first application for communicating a message from the first application to the network resource via a communications pathway, wherein the message comprises a part of a transaction;
determining, by the one or more processors, a passage of a period of inactivity between the application and the resource on the network connection assigned to the application;
returning, by the one or more processors, the network connection assigned to the first application, from the first application, to the pool, based upon the period reaching a defined threshold of inactivity, wherein based on the returning, the network connection assigned to the application is available for assignment to another application;
replacing, by the one or more processors, in the pool, the network connection assigned to the first application, with a placeholder to avoid the first application experiencing a broken connection exception, the placeholder comprising configuration data of the network connection assigned to the first application, wherein subsequent to the replacing, the pool of network connections comprises the network connections assigned to applications, the network connections available to be assigned to applications, and the placeholder, wherein the configuration data of the connection assigned to the first application comprises data specifying the transaction including a transaction identifier of the transaction and a purpose for communication over the network connection;
obtaining, by the one or more processors, via the placeholder, over the communications pathway, an indicator that the first application is attempting to communicate the message to the network resource;
based on obtaining the indication via the placeholder, replacing, by the one or more processors, the placeholder with an available network connection from the pool of network connections;
configuring, by the one or more processors, the available network connection in accordance with the configuration data in the placeholder to resume the communicating of the message and the transaction; and
resuming, by the one or more processors, communicating of the message and the transaction.

14. The computer program product of claim 13, the method further comprising:
obtaining, by the one or more processors, an indicator that a precondition has been met; and
based on obtaining the indicator, removing, by the one or more processors, the placeholder from the pool.

15. The computer program product of claim 14, wherein the precondition is a defined age of the placeholder.

16. The computer program product of claim 14, wherein the precondition is a request for a new network connection by the first application.

17. The computer program product of claim 13, wherein the determining the period of inactivity comprises:
obtaining, by the one or more processors, from the first application, a first indicator, indicating that communication over the network connection assigned to the first application has halted; and
based on the obtaining the first indicator, utilizing, by the one or more processors, a counter to count down from the defined threshold.

18. The computer program product of claim 17, wherein the determining the period of inactivity further comprises:
obtaining, by the one or more processors, from the application, a second indicator, indicating that communication of the network connection assigned to the first application has resumed; and
based on the obtaining the second indicator, resetting, by the one or more processors, the counter, to the defined threshold.

19. A system comprising:
a memory;
one or more processors in communication with the memory; and
program instructions executable by the one or more processors via the memory to perform a method, the method comprising:
assigning, by the one or more processors, a network connection to a first application, based upon the first application requesting the network connection from a pool of network connections for connecting applications to a network resource, wherein the pool of network connections comprises network connections assigned to applications and network connections available to be assigned to applications, the network connection assigned to the first application for communicating a message from the first application to the network resource via a communications pathway, wherein the message comprises a part of a transaction;

determining, by the one or more processors, a passage of a period of inactivity between the application and the resource on the network connection assigned to the application;

returning, by the one or more processors, the network connection assigned to the first application, from the first application, to the pool, based upon the period reaching a defined threshold of inactivity, wherein based on the returning, the network connection assigned to the application is available for assignment to another application;

replacing, by the one or more processors, in the pool, the network connection assigned to the first application, with a placeholder to avoid the first application experiencing a broken connection exception, the placeholder comprising configuration data of the network connection assigned to the first application, wherein subsequent to the replacing, the pool of network connections comprises the network connections assigned to applications, the network connections available to be assigned to applications, and the placeholder, wherein the configuration data of the connection assigned to the first application comprises data specifying the transaction including a transaction identifier of the transaction and a purpose for communication over the network connection;

obtaining, by the one or more processors, via the placeholder, over the communications pathway, an indicator that the first application is attempting to communicate the message to the network resource;

based on obtaining the indication via the placeholder, replacing, by the one or more processors, the placeholder with an available network connection from the pool of network connections;

configuring, by the one or more processors, the available network connection in accordance with the configuration data in the placeholder to resume the communicating of the message and the transaction; and resuming, by the one or more processors, communicating of the message and the transaction.

20. The system of claim 19, the method further comprising:

obtaining, by the one or more processors, an indicator that a precondition has been met; and based on obtaining the indicator, removing, by the one or more processors, the placeholder from the pool.

* * * * *